June 21, 1960  J. E. WOODS  2,941,404
AMBIENT-COMPENSATED ACTUATOR
Filed Dec. 24, 1954  2 Sheets-Sheet 1
Fig. 1
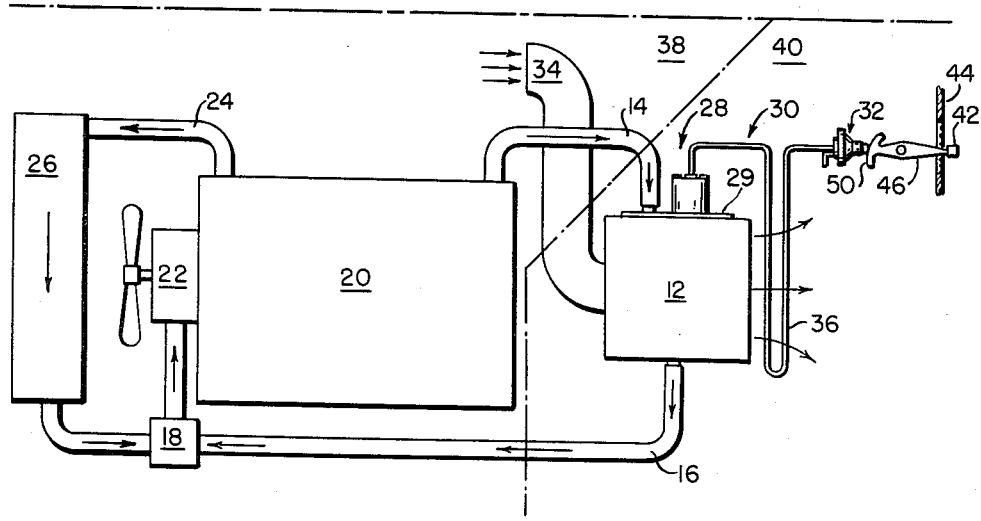
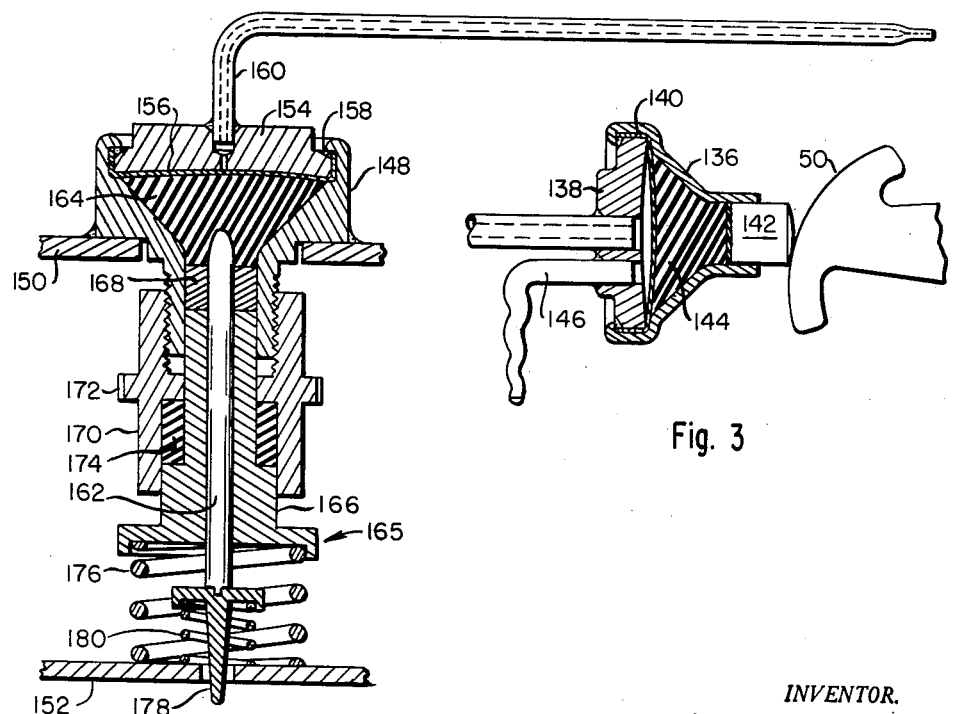
Fig. 3
Fig. 4
INVENTOR.
JOHN E. WOODS
BY *Kenway Jenney Witter & Hildreth*
ATTORNEYS

United States Patent Office 2,941,404
Patented June 21, 1960

2,941,404

AMBIENT-COMPENSATED ACTUATOR

John E. Woods, Cohasset, Mass., assignor to Standard-Thomson Corporation, Waltham, Mass., a corporation of Delaware Filed Dec. 24, 1954, Ser. No. 477,528

13 Claims. (Cl. 73—368.3)

The present invention relates to control devices, and more particularly to a remotely controlled mechanical actuator connected with the controlling means by an hermetically sealed fluid system, and compensated for ambient variations. Pressure changes within the fluid system produce corresponding displacements of a movable element in the actuator to perform useful work, such as operating a valve or closing a switch. Remote control systems of this type are commonly used for many purposes, for example as thermostatic controls, as pressure controls and as means for transmitting mechanical motion hydraulically for either indication or control.

This application describes an improvement in the actuator described in my copending application Serial No. 420,120, filed March 31, 1954. The actuator of said application is provided with a fully enclosed elastomeric body and a pin movably supported in contact with said body, whereby the pin is displaced by changes in displacement of the body produced by variations in the applied pressure transmitted to it through a flexible metal diaphragm. According to the present invention, I provide a second body of elastomeric material which acts as a compensator element, by means of which the thermal, physical and chemical effects of ambient conditions upon the first-mentioned elastomeric body may be controlled or substantially neutralized. I also provide adjustment and overtravel control features combined with compensation for ambient effects.

In some applications, the aforementioned ambient conditions at the actuator have been found to produce substantial effects which ultimately result in responsive movements of the working element or pin. Such movements are ordinarily not desired because they do not arise from corresponding directive pressure changes emanating from the remote source of control. A principal object of the present invention is to make provision to prevent the undesired changes within the elastomeric body surrounding said pin or element from being reflected in corresponding movements thereof.

More specifically, these ambient effects upon an elastomeric body, when used in an actuator of the type under consideration, may be caused in whole or in part by the following factors: First, natural and synthetic rubbers or rubber substitutes, which are described in said application as suitable materials for the elastomeric body, have appreciable volumetric temperature sensitivity. Second, the rubber or other elastomeric body may swell as a result of the sorption of fluids which exist in the environment. Third, fluids which were originally present in the elastomeric body (e.g., added lubricants) may tend to leach out of the body under certain conditions, thereby causing shrinkage of the body.

Another object is to provide means for adjustment in the actuator unit to vary the "control point," i.e., the range of applied fill temperatures within which the extremes of pin travel, or of force exerted by the pin, are achieved.

A further object is to provide overtravel means to limit the pressure which results from high ambient temperatures encountered either in storage or in use. Thus, under conditions of excessive pressure when the actuator pin or piston has reached its limit of outward movement, the compensator should preferably provide other means to relieve the pressure within the elastomeric body which actuates the pin.

A still further object is to provide means for varying the pressure at which the overtravel device begins to function, whereby the actuator can be adapted to a variety of requirements and conditions of use.

With the above and other objects in view, a principal feature of the invention, as heretofore stated resides in the incorporation into the actuator structure of a body of compensating elastomeric material. This material is preferably of the same chemical formulation as the elastomeric body which lies in contact with the pin. Structure is provided whereby changes in the volume of the compensator element cause corresponding volume changes in the main actuator cavity, thus providing means to prevent said changes from producing a corresponding pin movement.

Other features of the invention reside in certain features of construction, modes of operation and arrangements of the parts, including features of control and adjustment, which will be more clearly understood from the following description thereof, and from the appended drawings, in which:

Fig. 1 is a schematic illustration of an application of the invention to an air heater control system for automotive vehicles;

Fig. 3 is an elevation in section of a mechanical temperature "control point" adjusting device to be mounted preferably upon the dashboard in the vehicle passenger compartment of Fig. 1; and Fig. 4 is an elevation in section of a second form of the invention.

Figure 2:
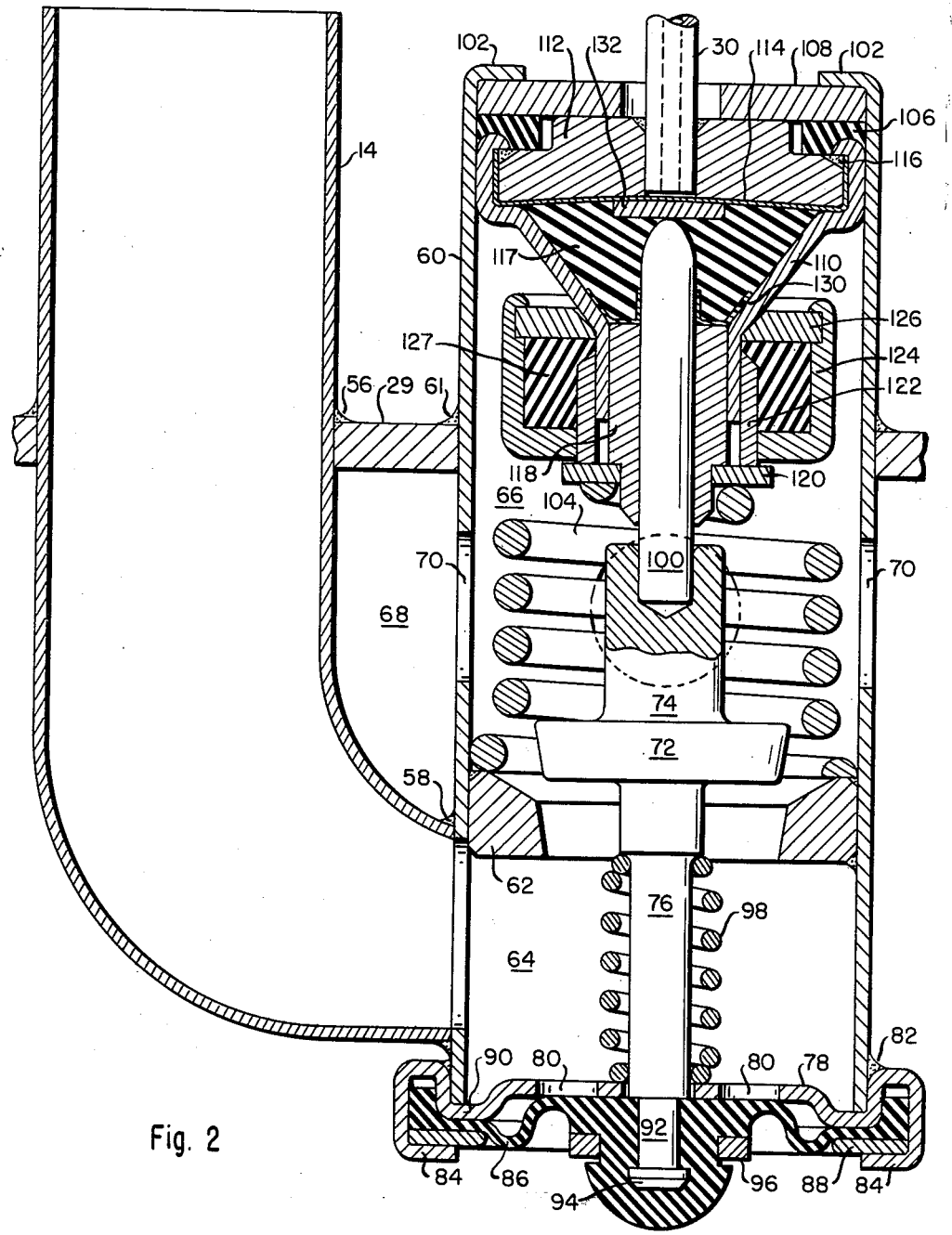
Fig. 2 is an elevation in section of one form of actuator, which is illustrated as applied to the system of Fig. 1.

Referring to Fig. 1, the invention is illustrated in a form adapted as an automotive heater control. A heat exchanger 12 is connected by means of an inlet pipe 14 and an outlet pipe 16 (through a T connection 18) to the engine block 20 of an internal combustion engine. The T connection enters the inlet opening of a water pump 22 of the usual type, and the water pump outlet is connected with the coolant passages within the engine block. In addition to the pipe 14, the engine block has an additional outlet pipe 24 which is connected with the radiator 26 in the usual manner. The radiator outlet is connected with the T connection 18. Hence, there are two distinct fluid circuits. Preferably, the circuit including the radiator 26 has a separate thermostatic valve in the pipe 24, not shown, in accordance with conventional practice.

The coolant circuit through the heater 12 is controlled by a valve actuator unit 28, shown in detail in Fig. 2. This unit is mounted directly in an end wall 29 of the heat exchanger so that it protrudes into a header space, and is connected by means of a capillary tube 30 with a dashboard control unit 32, hereinafter more fully described.

Incoming air enters the vehicle through a duct 34 which communicates with the air passages within the exchanger core. Ordinarily a fan, not illustrated, is mounted within the air duct or at some other suitable position in the air path. The air passes from the exchanger core over a loop 36 in the capillary tubing, into the passenger compartment. The dot-dash lines in the drawing indicate roughly the division of the engine and passenger compartments, the engine compartment being designated by reference number 38 and the passenger compartment by reference number 40.

On the dashboard of the vehicle there is preferably situated a manual control consisting of a horizontally movable lever knob 42 which passes through a slot on a plate 44 having suitable graduations. The lever 46 to which the knob 42 is secured is rotatable about a vertical axis, and carries an integral cam 50. The cam 50 bears upon the end of the control unit 32, which is more fully described hereinafter with reference to Fig. 3.

Temperature variations within the passenger compartment produce expansion or contraction of a thermal liquid fill in the capillary tubing 30, and these variations control the operation of the valve actuator unit 28, which in turn controls the flow of coolant from the pipe 14 through the heat exchanger 12. The loop 36 senses the temperature of the heated air as it leaves the exchanger 12, hence it tends to enhance the sensitivity of the control to temperature variations in the air entering said compartment, as fully described in the above-mentioned application.

The thermal fill within the tubing 30 remains in the same physical state under all conditions of operation. The thermal fill system is entirely filled, and hermetically sealed in metal. The structure of the valve actuator unit 28, as hereinafter more fully described, includes provision whereby a condition of maximum temperature which causes the valve to become fully seated is relieved by movement of an element independent of the pin which moves the valve, pushing against an over-travel spring. Also, the effects of ambient conditions at the valve which do not reflect the over-all temperature of the passenger compartment are controlled or rendered negligible, as will become evident from the detailed description of Fig. 2 to follow.

In Fig. 2, 29 represents the end wall of the heat exchanger 12 communicating with a header space. The duct 14 enters the header through a hole in the wall 29, and is soldered thereto or otherwise sealed in a conventional manner, as illustrated at 56. The duct is preferably but not necessarily necked down to a reduced diameter and soldered or otherwise sealed at 58 to an opening in the body 60 of the valve actuator assembly, said body also being soldered into said plate at 61. A valve seat member 62 is firmly secured by soldering to the body 60, thus forming an inlet chamber 64 and an outlet chamber 66 therein. The chamber 66 communicates directly with the header space 68 through holes 70 in the body 60.

A valve 72 is supported within the chamber 66 in position to close upon the seat member 62, and is provided with integral stem portions 74 and 76. The stem portion 76 passes slidably through a hole in a stiff metal closure plate 78 having a plurality of holes 80. The plate 78 is soldered or otherwise secured to the body 60 at 82.

In fabrication of the closure plate 78, prior to the formation of the inwardly-directed ears 84, a rubber diaphragm 86 and a metal ring 88 are inserted against a shoulder 90 of said closure plate, as illustrated. The ears 84 are then spun down or otherwise bent over the ring 88, thus securely fastening the periphery of the rubber diaphragm 86 and providing a water-tight seal.

The diaphragm is recessed to fit over a reduced end portion 92 of the valve stem, said stem having an enlarged end portion 94 for locking the valve stem and diaphragm together. As will be obvious, the stem is inserted into the diaphragm by pressure which radially distends the rubber until the end portion 94 reaches a corresponding recess in the diaphragm. A metal ring 96 is received over a generally hemispherical outer portion of the diaphragm, and serves with the ring 88 to control the effective area of the diaphragm in a manner hereinafter more fully described. It also assists in locking the diaphragm upon the valve stem by reason of its location behind the enlarged portion 94 thereof.

A valve spring 98 bears at one end against the fixed closure plate 78, and at the other end against a shoulder of the valve stem, thus urging the valve toward open position. The valve is restrained against opening by a metal pin 100 which extends upwardly, as viewed in the figure, into the actuator unit, the pin being fitted within a hole in the end of the stem portion 74.

In fabrication of the valve assembly, prior to formation of the inwardly-turned ears 102, an over-travel spring 104 is first inserted from the upper end until it bears against the valve seat member 62. After this, the actuator unit with its projecting pin 100 is inserted into position. Then, a rubber gasket 106 and a metal closure plate 108 are assembled in place. The parts are held by compression of the spring 104 until the ears 102 have been spun or otherwise bent to the positions shown in the drawing. The gasket 106 provides an effective seal against the escape of water from the chamber 66.

The details of the actuator will next be described. The body of the actuator consists of a metal enclosure including a member 110 having a conical portion and a pair of cylindrical portions, one of reduced diameter, and a rigid metal disk 112 having a slightly concave inner surface. To the disk is secured a flexible metal diaphragm 114 fitted over its edges and soldered along the annular recess 116 at the juncture of the back face and rim of the disk. The soldered disk and diaphragm are fitted within the enlarged cylindrical portion of the body 110, and the latter is then turned down over them, preferably by spinning, to provide a smooth, close fit. The disk 112 has a central hole into which is soldered the capillary tube 30 which communicates with the underside of the diaphragm 114. The thermal fluid within the capillary tube entirely fills the available space under all conditions, and any fluid which enters the space between the disk 112 and the diaphragm 114 is hermetically sealed by reason of the soldered joint at 116.

A molded body or plug 117 of rubber or other suitable elastomeric substance fills the space within the body member 110 and lies in contact with the end of the pin 100.

Slidably fitted within the smaller cylindrical section of the actuator body is a compensator sleeve 118 having at one end a reduced portion over which is fitted a metal washer 120. One end of the compression spring 104 bears against this washer. Slidably fitted over the outside of said smaller cylindrical portion of the body 110 is an outer sleeve 122 having a beveled end opposite to said washer. This movable outer sleeve comprises one part of the compensator assembly or casing. The other parts include a shell 124 and a plate 126 around which the shell is spun. The annular space formed within the compensator assembly is filled by a suitable molded body 127, preferably of the same chemical formulation as the body 117, such as natural or synthetic rubber, suitably impregnated, as fully described in the above-mentioned application. The annular inner edge of the disk 126 is beveled at an angle slightly in excess of the angle of the conical portion of the body 110 to provide a self-centering action whereby the compensator assembly is aligned with the actuator body 110 upon application of pressure by the spring 104.

A thin, easily distortable insert 130, fabricated of "Teflon" (a tetrafluoroethylene polymer) or other suitable non-flowable material, is retained within the body 110 so that it fits against the conical inner surface of said body and against an end of the compensator sleeve 118. The insert also preferably has a cylindrical portion which fits around the pin 100. It is very flexible, and yields upon application of pressure so that under all conditions of operation (except certain transient conditions hereinafter discussed), said insert rests against the compensator sleeve 118, and follows any movement of the latter within the body 110.

A small metal disk 132 is embedded in the body 117. This disk may be fabricated of metal or a suitable plastic such as nylon or other tough substance, and functions to prevent the pin 100 from injuring the metal diaphragm 114.

The capillary tube 30 extends to a control unit 32 (Fig. 1) which is similar in mode of operation to the valve actuator previously described. This device also has a rigid metal body member 136, a rigid disk 138 having a slightly concave inner surface, a flexible metal diaphragm 140 soldered to the disk 138, and a pin 142 bearing upon the molded elastomeric plug 144. A fill tube 146 provides means for introducing thermal fluid into the system. The piston 142 is restrained by the cam 50, which may be turned by movement of the knob 42. The arm 46 moves within the slot in the calibrated plate 44 on the dashboard with sufficient friction to resist the tendency of the piston 142 to move the cam.

The fluid system is preferably filled after the capillary tube 30 has been soldered at each end into the diaphragm assembly. With the fill tube 146 open, the entire assembly is first evacuated. While evacuated, it is immersed in a similarly evacuated pool of thermal liquid. After the assembly is completely filled, the fill tube is crimped, and the end thereof soldered or welded in a suitable manner to complete the hermetic seal.

The actuator thus described is in many respects similar to that of said above-mentioned application. Temperature changes in the environment in which the capillary tube 30 is situated produce variations in the pressure of the thermal liquid fill against the metal diaphragm 114. The diaphragm flexes against the elastomeric body 117, and since the latter body has very limited compressibility, the substantially equal volume changes to compensate for the diaphragm movements are produced by movements of the pin 100 in relation to the actuator body 110. This varies the position of the valve 72 in relation to the seal member 62.

Under certain ambient conditions of operation, within the normal range, the compensator sleeve 118, the outer sleeve 122, and the washer are situated substantially as shown in the drawing. The valve is illustrated in the "full open" position. For this valve position, a certain corresponding pressure exists within the elastomeric body 117, and this produces a force upon the compensator sleeve 118, since the insert 130 does not offer appreciable resistance thereto. The compensator body 127 is also under a certain pressure and exerts a force tending to move the outer sleeve 122 longitudinally of the valve axis. The spring 104 exerts a certain force against the washer 120 which is resisted by, and balanced against, both the compensator sleeve 118 and the outer sleeve 122.

Assuming that the ambient conditions at the valve actuator assembly do not change from those assumed above, the compensator sleeve 118 remains in fixed relation to the body 110 throughout the normal range of motion of the pin 100. As above stated, variations in the thermal liquid pressure in the capillary 30 produce variations in the pressure within the elastomeric body 117, and these produce corresponding movements of the pin 100 against the reaction of the compression spring 98.

However, a variation from the assumed ambient conditions affects the volumes of the elastomeric bodies 117 and 127, and the compensator assembly functions to prevent said variations from causing motion of the pin. Thus, if the body 117 tends to swell through adsorption of some of the circulating coolant liquid in the system, or by reason of an increase in the ambient temperature (e.g., an increase in the temperature of the circulating coolant), a similar change occurs in the compensator body 127. Swelling of the body 127 causes longitudinal movement of the outer sleeve 122. This allows the compensator sleeve 118 to move an equal distance, thereby limiting the pressure rise within the elastomeric body 117. Thus, the net effect of the ambient variation upon the pressure within the body 117 can be controlled or made negligibly small. The reverse conditions, wherein the compensating body 127 shrinks from the assumed initial value, produce opposite movement of the sleeves 118 and 122, and the resultant movement of the pin 100 is likewise controlled or made negligible in a substantially similar manner.

In addition to compensation for ambient temperature conditions, the illustrated valve actuator assembly provides overtravel protection. Thus, in the event of an excess in pressure within the body 117, which cannot be compensated for by further movement of the valve 72 (by reason of its being fully seated), the sleeve 118 can continue to move downwardly against the force of the spring 104. Thus, excessive pressures and damage to the apparatus is prevented.

It will be observed that the valve is of balanced construction. The inlet coolant fluid exerts substantially equal force against the inlet face of the valve 72 and the rubber diaphragm 86. The effective area of the diaphragm is substantially equal to the effective area of the valve. By reason of this construction, the opening of the valve occurs only when the spring 98 overcomes the pressure within the elastomeric body 117. Thus, the force tending to open the valve is not affected by a change in coolant pressure drop across the valve, such as might result, for example, from a change in the speed of the circulating pump. Thus, the assembly is sensitive to the pressure in the capillary tube 30, but not to the pressure of the circulated fluid or the ambient conditions at the valve actuator assembly.

It will also be observed that under certain conditions the sleeve 118 moves downwardly and away from the elastomeric body 117. This creates a possibility of air or coolant entering the temporary void between the sleeve 118 and the insert 130. However, the pressure in the body 117 soon causes the insert to move against the sleeve, thus expelling these substances and at the same time sealing the body 117 so that it is not exposed thereto.

It will be understood that instead of placing the valve actuator assembly 28 in the end of the heat exchanger 12, said assembly may be placed, if desired, in the engine block, preferably at the entrance to the pipe 14. In that event, a portion of the length of the capillary tube 30 extends into the engine compartment 38. To reduce the ambient temperature effect upon this portion of the thermal fill, a wire of slightly smaller diameter than the inner diameter of the capillary tube is inserted within the latter, said wire extending only through the portion of the capillary within the engine compartment. This substantially reduces the total volume of thermal fill in that portion of the system.

The portion of the capillary within the passenger compartment has sufficient volume of thermal fluid to produce the required stroke of the actuator pin 100 between the temperature limits within which the heater is designed to operate. As stated in the above-mentioned application, the total volumetric change required to achieve a full stroke of the pin is very small in actuators of the type herein described.

The alternative embodiment of the actuator illustrated in Fig. 4 includes an adjustment feature whereby a considerable range of operating conditions can be accommodated. The body member 148 is secured to one of two fixed plates 150 and 152. A rigid disk 154 having a slightly concave inner surface has a flexible metal diaphragm 156 fitted over the edges thereof, the disk and diaphragm being soldered or otherwise hermetically sealed together at 158. The body member passes around and is spun securely and smoothly onto the assembled disk and diaphragm. A capillary tube 160 is received into a central hole in the disk 154, and soldered to the latter.

A metal pin 162 is slidably supported in position to extend into the body 148. A molded body 164 of elastomeric material fills the member 148 and lies in contact with the end of the pin.

Surrounding the pin is a compensating sleeve 165 consisting of a lower portion 166 and a separate upper portion 168. The compensating sleeve is divided into separate portions for reasons similar to those discussed above with reference to Fig. 2. Thus, sudden outward movements of the lower portion 166 create a temporary void between the upper and lower portions into which air or coolant liquid may be introduced. Such contaminants are thus kept out of contact with the body 164 as the upper portion 168 moves back into its normal engagement with the lower portion.

A cylindrical portion of the body member 148 is outside threaded to receive an adjustment thimble 170 having a knurled flange 172 for manual turning. An elastomeric compensating body 174 is supported between the sleeve 166 and the thimble. A compression spring 176 urges the compensating sleeve upward against the body 164. A member 178 having a central hole is fitted onto the end of the pin 162, and transmits upward force thereto through a compression spring 180.

In operation, the embodiment of Fig. 4 is very similar to that of Fig. 2. Under certain ambient conditions in the normal range, the compensating body 174 has a certain volume corresponding to a specific spatial relationship between the sleeve 166 and the thimble 170. While these ambient conditions remain constant, variations of pressure in the capillary 160 produce corresponding movements of the pin 162 from the fully retracted position illustrated to the fully extended position. If the ambient conditions vary, the volume of the body 174 changes accordingly, thus moving the compensating sleeve 165 in the appropriate direction in relation to the body 164 to compensate for the direct effect of the ambient change thereon.

A change in the "control point" adjustment by rotation of the thimble 170 in relation to the body member 148 moves the assembly consisting of the thimble, the body 174 and the sleeve 165 as one unit, since the body 174 is substantially incompressible. This produces a volumetric displacement within the body member 148 that results in an equal volumetric displacement of the pin 162. This is in the nature of a temperature adjustment like that of the device of Fig. 3. An overtravel adjustment is also effected in the illustrated embodiment, since the change in compression of the spring 176 caused by the adjustment establishes a new pressure level at which the body 164 can displace the sleeve 165.

However, while the illustrated means of adjustment changes both the pressure limit at which overtravel is effected as well as the displacement range of the pin 162, it is possible to change this by providing means other than the plate 152 to support the lower end of the spring 176. Such means may be integral with the thimble 170, and in that event rotation of the thimble produces no effect on the pressure limit for overtravel movement.

It will be observed that the area of the compensating element or sleeve exposed to the body 164 is substantially greater than the cross-sectional area of the pin 162. This fact gives rise to a mechanical advantage. The axial movement of the thimble 170 is multiplied by the ratio of these areas; hence, it is only a fraction of the axial movement of the pin 162 required to effect an adjustment.

Furthermore, is will be noted that any adjustment in the direction of reduced temperature tends to urge the sleeve 168 into the member 148, thus also tending to increase the force on the body 164. However, this force is distributed over the comparatively large area of the sleeve 168, and produces a pressure inversely related to the said area. Such pressure may obviously be held within limits by using a sleeve of suitable area, having in mind the range of adjustment for which the device is intended.

It will thus be observed that I have provided a distance controlled actuator of the hermetically sealed, entirely filled type which includes the combination of overtravel protection, control point adjustment and compensation for ambient temperature conditions. In this device, a restrained body of elastomeric material is caused by pressure variations to urge a pin to move against an applied resistance and thereby to perform useful work. It has been found that an actuator of this type is capable of use under a wide variety of ambient conditions, and that variations in said conditions, although having a significant effect upon said elastomeric body, do not have appreciable effect on the pin movement due to the provision of a separate body of compensating material, which is subject to the same ambient conditions and varies volumetrically in the same manner as the elastomeric body which is in contact with the pin.

It will be understood that many variations of structure, design and arrangement of the parts of the illustrated embodiment may be effected to adapt the invention to a variety of uses and applications. Such variations or adaptations as would occur to those skilled in the art upon a reading of the foregoing specification and appreciation of the invention, are included within the scope thereof.

Having thus described the invention, I claim:

1. An actuator having, in combination, a body portion defining a chamber and having a sleeve bearing and a flexible metal diaphragm forming a wall of the chamber, a movable element passing through said bearing, a compensator element variably protruding into said chamber, a first deformable body completely filling said chamber and contacting an end of the movable element, pressure means hermetically sealed in metal and completely filled with fluid to displace the diaphragm and thereby to move the movable element, and a second deformable body in position to displace the compensator element to compensate for ambient effects upon said first deformable body.

2. An actuator having, in combination, a body portion defining a chamber and having a sleeve bearing and a flexible metal diaphragm forming a wall of the chamber, a compensator sleeve received in said bearing, a pin received in the sleeve, a first deformable body completely filling said chamber and contacting an end of the pin, pressure means hermetically sealed in metal and completely filled with fluid to displace the diaphragm thereby to move the pin, and a second deformable body in position to displace the sleeve to compensate for ambient effects upon said first deformable body.

3. An actuator having, in combination, a body portion defining a chamber and having a sleeve bearing and a flexible metal diaphragm forming a wall of the chamber, a movable element passing through said bearing, a compensator element variably protruding into said chamber, a first elastomeric body completely filling said chamber and contacting an end of the movable element, pressure means hermetically sealed in metal and completely filled with fluid to displace the diaphragm and thereby to move the movable element, resilient means urging the compensator element into said first elastomeric body, and a second elastomeric body in position to oppose the force of said resilient means upon the compensator element and to cause displacement thereof to compensate for ambient effects upon said first elastomeric body, whereby said resilient means permit overtravel movement of said compensator element.

4. An actuator having, in combination, a body portion defining a chamber and having a sleeve bearing and a flexible metal diaphragm forming a wall of the chamber, a compensator sleeve received in said bearing, a pin received in the sleeve, a first elastomeric body completely filling said chamber and contacting an end of the pin, pressure means hermetically sealed in metal and completely filled with fluid to displace the diaphragm and thereby to move the pin, a spring urging the sleeve into said first elastomeric body, and a second elastomeric body in position to oppose the force of said spring upon the sleeve and to cause displacement thereof to compensate for ambient effects upon said first elastomeric body, whereby said spring permits overtravel movement of said compensator sleeve.

5. An actuator having, in combination, a body portion defining a chamber and having a sleeve bearing and a flexible metal diaphragm forming a wall of the chamber, a movable element passing through said bearing, a compensator element variably protruding into said chamber, a first elastomeric body completely filling said chamber and contacting an end of the movable element, pressure means hermetically sealed in metal and completely filled with fluid to displace the diaphragm and thereby to move the movable element, and a second elastomeric body adjustably supported in position to displace the compensator element to compensate for ambient effects upon said first elastomeric body.

6. An actuator having, in combination, a body portion defining a chamber and having a sleeve bearing and a flexible metal diaphragm forming a wall of the chamber, a compensator sleeve received in said bearing, a pin received in the sleeve, a first elastomeric body completely filling said chamber and contacting an end of the pin, pressure means hermetically sealed in metal and completely filled with fluid to displace the diaphragm and thereby to move the pin, and a second elastomeric body adjustably supported in position to displace the compensator element to compensate for ambient effects upon said first elastomeric body.

7. An actuator having, in combination, a body portion defining a chamber and having a sleeve bearing and a flexible member forming a wall of the chamber, a movable element passing through said bearing, a compensator element variably protruding into said chamber, a first deformable body completely filling said chamber and contacting an end of the movable element, pressure means to displace the flexible member and thereby to displace said first body and move the movable element, resilient means urging the compensator element into said first deformable body, and a second deformable body in position to oppose the force of said resilient means upon the compensator element and to cause displacement thereof to compensate for ambient effects upon said first deformable body, whereby said resilient means permit overtravel movement of said compensator element.

8. An actuator having, in combination, a body portion defining a chamber and having a sleeve bearing and a flexible member forming a wall of the chamber, a movable element passing through said bearing, a compensator element variably protruding into said chamber, a first deformable body completely filling said chamber and contacting an end of the movable element, pressure means to displace the flexible member and thereby to displace said first body and move the movable element, and a second deformable body in position to displace the compensator element to compensate for ambient effects upon said first deformable body.

9. An actuator having, in combination, a body portion defining a chamber and having a sleeve bearing and a flexible metal diaphragm forming a wall of the chamber, a movable element passing through said bearing, a compensator element variably protruding into said chamber, a first elastomeric body completely filling said chamber and contacting an end of the moveable element, pressure means hermetically sealed in metal and completely filled with fluid to displace the diaphragm and thereby to move the movable element, resilient means urging the compensator element into said first elastomeric body, a compensator casing independently adjustable in relation to said body portion, and a second elastomeric body confined within said compensator casing in position to oppose the force of said resilient means upon the compensator element and to cause displacement thereof to compensate for ambient effects upon said first elastomeric body, whereby said resilient means permit overtravel movement of said compensator element.

10. An actuator having, in combination, a body portion defining a chamber and having a sleeve bearing and a flexible metal diaphragm forming a wall of the chamber, a compensator sleeve received in said bearing, a pin received in the sleeve, a first elastomeric body completely filling said chamber and contacting an end of the pin, pressure means hermetically sealed in metal and completely filled with fluid to displace the diaphragm and thereby to move the pin, a spring urging the sleeve into said first elastomeric body, a compensator casing independently adjustable in relation to said body portion, and a second elastomeric body confined within said compensator casing in position to oppose the force of said spring upon the sleeve and to cause displacement thereof to compensate for ambient effects upon said first elastomeric body, whereby said spring permits over-travel movement of said compensator sleeve.

11. A remotely-controlled actuator having, in combination, a housing having a sleeve bearing and defining a chamber, a rigid actuator element slidably received in the bearing, a compensator element variably protruding into the chamber, a body of deformable material within the chamber and covering the entire portions of said actuator and compensator elements within the chamber, a capillary connected to a space within the chamber adjacent to said body and extending to a position remote from the housing, a thermal responsive liquid filling the capillary and said space, and means to vary the position of the compensator element to compensate for ambient effects upon said deformable body.

12. A remotely-controlled actuator having, in combination, a housing having a sleeve bearing and defining a chamber, actuator means slidably received in the bearing, said means including slidably received in said bearing a rigid control member and a compensating member to provide for increase in the volume of the chamber in response to an increase in ambient temperature, a body of elastomeric material within the chamber and covering the entire portion of said actuator means within the chamber, a capillary connected to a space within the chamber adjacent to said body and extending to a position remote from the housing, and a thermal responsive liquid filling the capillary and said space, whereby an increase in the volume of said liquid within the space increases the pressure on said body and tends to force said control member from the housing.

13. A remotely-controlled actuator having, in combination, a housing having a sleeve bearing and defining a chamber, a rigid actuator element slidably received in the bearing, a compensator element variably protruding into the chamber, a body of deformable material within the chamber and covering the entire portions of said actuator and compensator elements within the chamber, a capillary connected to a space within the chamber adjacent to said body and extending to a position remote from the housing, a thermal responsive liquid filling the capillary and said space, and a second body of deformable material in position to displace the compensator element to compensate for ambient effects upon said first-mentioned body.

References Cited in the file of this patent

UNITED STATES PATENTS

| | | |
|---|---|---|
| 2,072,693 | Volkert | Mar. 2, 1937 |
| 2,208,149 | Vernet | July 16, 1940 |
| 2,673,038 | Vernet | Mar. 23, 1954 |

FOREIGN PATENTS

| | | |
|---|---|---|
| 702,868 | France | Jan. 27, 1931 |
| 531,280 | Great Britain | Jan. 1, 1941 |